(12) United States Patent
Alcoverro Vidal et al.

(10) Patent No.: US 9,805,256 B2
(45) Date of Patent: Oct. 31, 2017

(54) METHOD FOR SETTING A TRIDIMENSIONAL SHAPE DETECTION CLASSIFIER AND METHOD FOR TRIDIMENSIONAL SHAPE DETECTION USING SAID SHAPE DETECTION CLASSIFIER

(71) Applicant: FEZOO LABS, S.L., Sant Cugat Del Vallès (ES)

(72) Inventors: Marcel Alcoverro Vidal, Barcelona (ES); Adolfo Lopez Mendez, Granollers (ES); Xavier Suau Cuadros, Cervera (ES)

(73) Assignee: EXIPPLE STUDIO, S.L., Barcelona (ES)

( * ) Notice: Subject to any disclaimer, the term of this patent is extended or adjusted under 35 U.S.C. 154(b) by 0 days.

(21) Appl. No.: 14/970,957

(22) Filed: Dec. 16, 2015

(65) Prior Publication Data

US 2016/0180157 A1 Jun. 23, 2016

(30) Foreign Application Priority Data

Dec. 17, 2014 (EP) .................................. 14382532

(51) Int. Cl.
*G06K 9/00* (2006.01)
*G06K 9/62* (2006.01)
(Continued)

(52) U.S. Cl.
CPC ......... *G06K 9/00355* (2013.01); *G06F 3/017* (2013.01); *G06K 9/00201* (2013.01);
(Continued)

(58) Field of Classification Search
CPC .... G06F 3/017; G06K 9/00355; G06K 9/627; G06K 9/00201; G06K 9/00389;
(Continued)

(56) References Cited

U.S. PATENT DOCUMENTS

| 9,383,895 B1* | 7/2016 | Vinayak | G06F 3/017 |
| 2012/0117514 A1* | 5/2012 | Kim | G06F 3/011 715/849 |

(Continued)

OTHER PUBLICATIONS

Adolfo Lopez-Mendez et al., Can our TV robustly understand human gestures?, Visual Media Production, Dec. 5, 2012, pp. 18-25, XP058010572.

(Continued)

*Primary Examiner* — Tom Y Lu
(74) *Attorney, Agent, or Firm* — Sughrue Mion, PLLC

(57) ABSTRACT

Method for setting a tridimensional shape detection classifier for detecting tridimensional shapes from depth images in which each pixel represents a depth distance from a source to a scene, the classifier comprising a forest of at least a binary tree (T) for obtaining the class probability (p) of a given shape comprising nodes associated with a distance function (f) that taking at least a pixel position in a patch calculates a pixel distance. The method comprises per each leaf (L) node of the binary tree the configuration steps of creating candidate groups of parameters; obtaining positive patches (Ip) containing part of the shape to be detected; obtaining negative patches (In) not containing part of the shape to be detected; calculating in the leaf node the distance function of the obtained positive and negative patches comparing the result of the distance function with its pixel distance threshold and computing its statistics; and selecting for the leaf node the candidate group of parameters that best separate the positive and negative patches into two groups for calculating the class probability of the shape in that leaf node using the distance function. It is also disclosed a method for shape detection from a depth image using the shape detection classifier; a data processing apparatus comprising means for carrying out the methods; and a computer program adapted to perform the methods.

14 Claims, 5 Drawing Sheets

(51) Int. Cl.
   *G06F 3/01*     (2006.01)
   *G06T 7/593*    (2017.01)
   *G06T 7/11*     (2017.01)
   *G06T 7/174*    (2017.01)

(52) U.S. Cl.
   CPC ......... *G06K 9/00389* (2013.01); *G06K 9/627* (2013.01); *G06K 9/6282* (2013.01); *G06T 7/11* (2017.01); *G06T 7/174* (2017.01); *G06T 7/593* (2017.01); *G06T 2207/10028* (2013.01); *G06T 2207/20021* (2013.01); *G06T 2207/20076* (2013.01); *G06T 2207/20081* (2013.01); *G06T 2207/30196* (2013.01)

(58) Field of Classification Search
   CPC ........ G06K 9/6282; G06T 2207/10028; G06T 2207/20021; G06T 2207/20076; G06T 2207/20081; G06T 2007/30196; G06T 7/0075; G06T 7/0081; G06T 7/0097; G06T 7/11; G06T 7/174
   USPC .................................................. 382/103, 154
   See application file for complete search history.

(56) References Cited

U.S. PATENT DOCUMENTS

| | | | | |
|---|---|---|---|---|
| 2015/0036942 A1* | 2/2015 | Smirnov | ............. | G06K 9/6282 382/227 |
| 2015/0199592 A1* | 7/2015 | Kim | ..................... | G06K 9/6267 382/202 |
| 2015/0379376 A1* | 12/2015 | Muff | ..................... | G06K 9/6267 382/224 |
| 2016/0078289 A1* | 3/2016 | Michel | ..................... | G06T 7/73 345/156 |
| 2016/0085310 A1* | 3/2016 | Shotton | ................... | G06F 3/017 382/103 |

OTHER PUBLICATIONS

Marcel Alcoverro et al., "Gesture control interface for immersive panoramic displays", Multimedia Tools and Applications, Jul. 25, 2015 , pp. 491-517, vol. 73, No. 1, XP035396044.

Danhang Tang et al., "Latent Regression Forest: Structured Estimation of 3D Articulated Hand Posture", 2014 IEEE Conference on Computer Vision and Pattern Recognition, Jun. 23, 2014, pp. 3786-3793, XP032649483.

Jamie Shotton et al., "Real-time human pose recognition in parts from single depth images", Communications of the ACM, Jan. 1, 2013, pp. 116-124, vol. 56, No. 1, XP058010058.

European Search Report for EP 14 38 2532 dated Jun. 19, 2015.

* cited by examiner $p_1(c|I)$  $p_2(c|I)$  $p_3(c|I)$

METHOD FOR SETTING A TRIDIMENSIONAL SHAPE DETECTION CLASSIFIER AND METHOD FOR TRIDIMENSIONAL SHAPE DETECTION USING SAID SHAPE DETECTION CLASSIFIER

TECHNICAL FIELD OF THE INVENTION

The invention relates to the field of digital image analysis and remote control of devices. It further relates to a method for controlling an operation mode of a device using touch-free still gesture detection from an RGBD sensor. More particularly, a method to train a gesture recognizer to detect still gestures of users from range data, and control an operation mode of a device based on the recognized gesture.

BACKGROUND OF THE INVENTION

Gesture detection or recognition is a technology particularly suited for interactive systems for several reasons. First, gestures are commonly used in natural conversation and non-verbal communication, thus, in general people feel comfortable when gesturing. Moreover, gestures form a vocabulary or language, so they can be used to convey specific information directly interpretable by the computer, for example, to activate distinct events in an interactive application. Also this kind of interaction would be naturally understood and easily remembered by the user, as again, it is our form of non-verbal communication and we feel familiar with its usage. For this reason, interfaces based on gestures can be simpler than other kinds of interaction where the user feels less comfortable and require a longer learning curve.

Gesture recognition technologies focus on the recognition of a particular body movement or pose by means of the classification of sensor data using a computer program. Data classification methods require examples of each class in order to compute models that allow the recognition of the gesture from novel input data. Data collection and annotation is a cumbersome task that in the case of body gestures requires substantial human effort. The present invention allows to collect and annotate data examples and train gesture classifiers with a considerable reduction of human effort in such tasks.

Conventionally, gesture recognition technologies require tracking of body parts, i.e. skeleton tracking as described in U.S. Pat. No. 8,824,781. In these cases, gesture recognition is based on the classification of trajectories and relative positions of the joints of the skeleton (e.g. Microsoft SDK, Kinect Studio).

Such gesture recognition approaches depend on the accuracy of the skeleton tracking method employed in order to classify the gesture. Moreover, depending on the number of skeleton joints obtained, some gestures cannot be recognized, because the lack of resolution. For example, in case that the skeleton tracking approach does not capture finger joints position, gestures involving finger pose will not be recognized. Capturing skeleton joints pose is a computationally expensive task, especially when attempting to compute hand fingers pose, due to the high number of joints and degrees of freedom. Also, existing methods for hand skeleton tracking only capture the pose at close range to the input sensor (<1 meter). For all these reasons, gesture recognition based on skeleton tracking is not suitable for certain scenarios. This is the case when the application requires low computational load, or requires response in cases where the full body might be not visible, or when gesture recognition is needed at distances greater than 2 m from the sensor. The present invention concerns a system able to detect still gestures, which only rely on the classification of depth image patches. The system does not require skeleton tracking and determines the gesture relying on local shape. In this manner, gestures involving fingers, hands, arms or any body part can be recognized at distance from the sensor, given that the pixel resolution of the sensor is enough to capture the shape details that distinguish the gesture. Operating in this manner the computational load is lower than for the task of skeleton tracking and, moreover, the gesture can be recognized in case of occlusions or partial view of the body.

Similarly to the present invention, some hand gesture recognition approaches rely on depth image features in the local context of the hand such as the described in U.S. Pat. No. 7,340,077. Such approaches require to previously perform hand segmentation. This segmentation step is prone to errors, and in addition, implies that the system is not able to recognize gestures in which other parts of the body are involved, such as head or arms. This fact limits its application to a subset gestures. The present invention does not require such segmentation step, which extends the applicability of the system to further cases and scenarios.

The present invention relies on still gesture localization. The detector obtains the position of the gesture both in the image and in 3D world domain and identifies the gesture class. In the task of training the gesture detector, the main difficulty is that the training data is highly unbalanced, the training set is usually composed by few positive examples and a huge amount of negative examples. The techniques for negative sample mining described in J. Gall, A. Yao, N. Razavi, L. Van Gaol, and V. Lempitsky "Hough forests for object detection, tracking, and action recognition" TPAMI, 33(11):2188-2202, 2011 are proposed to overcome this issue. In such methods, the best training samples are automatically chosen. Even though, the performance of the method is still highly influenced by the set of negative examples available in the training set.

Once a detector is trained, one can realize that the detector fails for certain examples. An experimental solution to this problem is to collect more data based on the test failures, and train again the detector. This process can be tedious, as training can be slow, and once it finishes one would require to manually test and record new data, and then train again and so, in an iterative manner. Also the training set will grow and, as a consequence, the training process will be slower and the memory requirements will also grow.

Batch learning methods are also known, such as the one proposed in Alcoverro Marcel et. al. "*Gesture control interface for immersive panoramic displays*", *Multimedia tools and applications*, Kluwer academic publishers, vol. 73, no. 1, July 2013 pages 491-517. However, batch learning methods require a high amount of resources, such as computational speed and memory. Therefore, unless a high amount of resources are provided, batch learning methods do not provide a reliable level of accuracy.

It is then an objective of the present invention to present a method for setting a tridimensional shape classifier and a method for shape detection using said classifier with a better performance and reliability.

DESCRIPTION OF THE INVENTION

The method for setting a tridimensional shape detection classifier of the present invention is useful for detecting tridimensional shapes, particularly hand gestures, from depth images in which each pixel represents a depth distance from a source to a scene, each depth image being dividable into one or more patches of given dimensions, the classifier comprising a forest of at least a binary tree for obtaining the class probability of a given shape comprising nodes associated with a distance function that taking at least a pixel position in a patch calculates a pixel distance, the method comprising obtaining one or more positive patches of the given dimensions from a depth image, said one or more positive patches containing the shape to be detected, and obtaining one or more negative patches of the given dimensions from a depth image, said one or more negative patches not containing the shape to be detected.

The method further comprises, for each obtained positive or negative patch, traversing the binary trees starting from their root node using the distance function at each node to decide to continue to one of the child nodes of the next level until a leaf node of each binary tree is reached, and calculating in each reached leaf node the distance function for the patch using candidate groups of parameters, each candidate group of parameters comprising at least a pixel position in a patch, a depth clipping window in the patch and a pixel distance threshold; by comparing the result of the distance function using the at least a pixel position and the depth clipping window with the pixel distance threshold of each candidate group, and computing its statistics. Therefore, a plurality of candidate groups of parameters are evaluated for their suitability for separating positive and negative patches in each leaf node.

The method further comprises, when more than a predefined number of positive or negative patches are applied to a leaf node of the classifier, selecting for that leaf node the candidate group of parameters that best separate the positive and negative patches into two groups for calculating the class probability of the shape in that leaf node using the distance function; creating a new level of the binary tree from that leaf node comprising two newly created leave nodes, thus that leaf node becoming a node, and passing the statistics from that leaf node that has become a node to the newly created leaf nodes. Therefore, the method for setting a tridimensional shape detection classifier allows the growth of the binary trees of the forest, thus achieving incremental learning, when positive or negative patches are provided. Moreover, the method for setting a tridimensional shape detection classifier allows further training a previously set shape detection classifier when more positive or negative patches are provided. Also, the number of binary trees of the forest could be modified if necessary, for example new binary trees could be created by setting new root nodes. Also, the binary trees that worse separate the positive and negative patches could be removed, if necessary, thus freeing their allocated memory.

By using an incremental learning approach, a convenient long-term solution to obtain robust classifiers with less computation and memory requirements is achieved. Incremental learning means that the classifier model is updated each time it is shown a new data sample, hence the classifier is not re-trained using the whole dataset when the dataset is modified.

Advantageously, an incremental learning approach also provides and improvement of accuracy and computation and memory requirements with respect to batch learning methods.

A leaf node could be a root node of a binary tree or leave nodes of a binary tree already set up. Therefore, the present invention concerns a training approach based on incremental learning. Incremental learning has advantages with respect to commonly used batch learning. Batch learning refers to these techniques where learning is done from the entire dataset at once. In incremental learning the model is updated each time it is shown with a new data sample or small batches of samples. One of the advantages of employing incremental learning is when considering the issue of efficiently collect negative examples. When using incremental learning the selection of the appropriate training data can be done during the training phase, according to the prediction provided by the classifier trained upon that time. The classifier is trained incrementally as new data is collected. At each time instant, the rough classifier already trained at this point is used to collect relevant examples. Relevant negative patches for each captured image are collected using the response of the detector. For instance, in an image containing only negative example patches, only the patches with maximal response of the detector will be collected, i.e. the false positives. This technique improves the accuracy of the classifier when compared to a classifier trained with the whole image dataset in a single batch.

Through this method, one or more binary trees of a tridimensional shape classifier can be created during a training phase, that can be created offline or online. Advantageously, after setting the tridimensional shape classifier for obtaining the class probability of the shape to be detected, additional patches extracted from depth images can be correctly classified, so a probability of a patch containing the shape to be detected can be obtained by traversing the binary trees of the forest.

In an embodiment of the invention, each candidate group of parameters comprises at least a random pixel position in a patch, a random depth clipping window in a patch and a random pixel distance threshold. This way, a representative sample of all the combinations of parameters can be evaluated.

In an embodiment of the invention, when more than a predefined number of positive or negative patches are applied to a leaf node of the shape detection classifier, and preferably the information gain in said node reaches an information threshold which could be for example between 0 and 0.1, 0 meaning that no information gain is necessary, the method further comprises creating a new level of the binary tree from said leaf node, that could be a root node or a leaf node in any level of the binary tree, with two newly created leave nodes as child nodes and passing the statistics from the parent node to each respective newly created child leaf node; apply the configuration steps to the newly created leaf nodes so a candidate group of parameters can be associated to each newly created leaf node.

In an embodiment of the invention, at least part of the one or more positive patches and one or more negative patches are obtained from the same depth image. Advantageously, if a portion of the depth image is known to contain the shape, for example a hand gesture, it can be assumed that the rest of the depth image do not contain the shape, therefore the portion of the depth image is known to contain the shape will be assumed to be a positive patch while the rest of the depth image will be assumed to be negative patches. This way, the setting of the tridimensional shape detection classifier can be speeded as per each positive patch, a plurality of negative patches can be used. Although usually only one portion of the depth image will contain the shape to be detected, other portions of the depth image could also contain the shape to be detected. In this case, the user has to be warned of the portions of the depth image in which the shape has to be reproduced. For example, this would happen when a hand V sign is trained using both hands. Usually the user will be warned via a screen where instructions will be given and where the user could see the depth image taken, usually from him.

Although the method is extremely useful for detecting hand gestures from a depth image, other tridimensional shapes can be detected, for example sport balls, human heads, eyes, etc.

The depth image can be obtained from a live capture, so a user can be live instructed to reproduce the hand gesture in a specific region of the depth image. Naturally, a sequence of depth images will be captured, being able to set the tridimensional shape detection classifier with every depth image photogram live captured with an RGBD camera.

Thus, training is performed in real-time while capturing new gesture and non gesture examples. Data recording, annotation and training is fused in a single interactive application which allows to reduce the human efforts usually required in similar procedures employing off-line training of the classifier. The interactive machine learning system for gesture localization allows to reduce dramatically the time dedicated to recording, annotation and training.

Also, the one or more positive patches and the one or more negative patches can be obtained from a saved collection of depth images, in which the portions containing the tridimensional shape are known. Also the saved collection could be directly a collection of positive and negative patches for said tridimensional shape.

In an embodiment, the obtained one or more negative patches are the ones with highest positive class probability according to the statistics at the reached leaf nodes of the binary trees. Therefore, patches that are not relevant, for example empty patches, will not be taken into account when computing the statistics.

In an embodiment, the distance function calculates the relation between the depths represented by two pixels of the patch located in the random pixel position from the center pixel of the patch, normalized with the depth evaluated in the center pixel, each depth being upper and lower limited by the random depth distance clipping window centered in the value of depth represented by the center pixel of the patch.

This distance function could be the one represented by the formula:

$$f(I, x) = \max\left(\min\left(I\left(x + \frac{u}{I(x)}\right), I(x) + \kappa\right), I(x) - \kappa\right) - \max\left(\min\left(I\left(x + \frac{v}{I(x)}\right), I(x) + \kappa\right), I(x) - \kappa\right)$$

where I is the image, x the center of the patch, u and v are pixel positions and K is the clipping parameter. In such function the relation between the depths represented by two pixels is a subtraction. Naturally, other relations could also be used, for example an addition of the depths.

Although only two random pixel position are explained, any number of pixel position, relative or absolute could be used. The distance function could just use the central pixel of the patch or any other pixel, or three or more in relative or absolute positions in the patch. It is however necessary that the same pixel position could be evaluated in each patch.

In every possibility, the distance function would calculate the relation between the depths represented by said pixel position, being just one or a plurality. Preferably, the depth of each pixel would be upper and lower limited by a clipping window.

The method for shape detection from a depth image using the shape detection classifier of the present invention comprises the steps of dividing the depth image into patches of given dimensions; traversing the binary trees by applying the distance function at each visited node using the associated pixel displacement and maximum pixel distance and comparing the result of the distance function with the associated pixel distance threshold and; obtaining the probability of a specific shape leveraging on the statistics of the leaf nodes reached in each tree, so once the shape detection classifier, the probability of a specific shape can be calculated simply traversing the binary trees.

In an embodiment, if the forest comprises a plurality of binary trees, it further comprises averaging the probabilities of a specific shape obtained from the different leaf nodes of binary trees of the forest according to:

$$p(c \mid I, x) = \frac{1}{M} \sum_{m=1}^{M} p_{I_m}(c \mid I, x)$$

Where m=1 . . . M represents the different trees of the forests. Advantageously, all binary trees of the forest can be taken into account for obtaining the probabilities of a specific shape in a patch.

In an embodiment, the method for shape detection further comprises the steps of casting a vote for a target shape per each patch whenever the probability of said shape is higher than the probability of not being said shape or being another shape, and estimating a probability density for the target shape using said votes, thus a score can be calculated for a certain patch in a depth image sequence.

In an embodiment of the invention, the method for shape detection further comprises taking into account temporal consistency by recursively updating the probability density with votes aggregated from past time instants as follows:

$$p'(c|I_t) = \alpha p(c|I_t) + (1-\alpha) p'(c|I_{t-1})$$

Being α a weight between 0 and 1.

In an embodiment of the invention, the method for shape detection it further comprises detecting the pixel location of the target shape as the pixel with maximum probability.

In an embodiment of the invention, in the method for shape detection the probability is thresholded by locally integrating the probability measure through a circular surface of radius inversely proportional to the depth and centered at the global maximum.

$$V = \sum_{x \in S} p'(c \mid I_t(x))$$

A data processing apparatus comprising means for carrying out the methods of the preceding claims, for example a computer connected to a RGBD camera is also disclosed.

A computer program adapted to perform the method for setting a tridimensional shape detection and the method for shape detection is disclosed. Also a computer readable storage data carrier comprising said computer program is disclosed.

The invention further concerns an apparatus comprising: a device capturing images where each pixel represents the distance of a portion of the scene with respect to such device; a depth filtering unit filtering the images from the input device; a motion detection unit determining if any object in the scene moved during the last seconds; a gesture detection unit providing an hypothesis for the gesture class and position of still gestures in the input images; and an event triggering unit mapping the detected gesture identity to a specific target device event.

The invention also concerns a training unit that computes a set of decision trees such that the gesture detection unit can generate hypothesis of a particular gesture class.

As a result one aspect of the present invention is a still gesture detection method allowing touch-free control of a target device.

As a result one aspect of the present invention is a method allowing the user to train the system to detect a new custom gesture.

In an embodiment, the depth filtering unit comprises a computer-based implementation of a method or device for removal of RGBD sensor errors.

In an embodiment, the motion detection unit comprises a computer-based implementation of method or device for detecting moving pixels in depth data. This allows for predicting regions of the input images where still gestures might occur in the future (or equivalently, to discard regions of the image where it is very unlikely that a gesture might occur).

In an embodiment, the training unit comprises a computer-based implementation of an online random forest classifier.

In an embodiment, the gesture detection unit, given depth data representing a patch in the input depth image, and given a set of decision trees (i.e. a decision forest) for each gesture class, is designed to provide a score for each target gesture class. These scores represent the probability of a patch belonging to each target class. A patch is usually squared and of smaller size of the input image. The process of the gesture detection unit generating gesture class scores for each patch is hereinafter referred to as classifying a patch.

In an embodiment, the gesture detection unit classifies a patch using decision forests. Decisions at nodes of the trees are solely based on the difference between 2 pixels picked within the target patch. Pixels are defined as a displacement from the centre of the patch. Such displacement is normalised by a reference depth value (obtained from the same patch) such that displacements in the image are invariant to depth.

In an embodiment, the gesture detection unit classifies a patch using local depth context. The local context is defined as a depth margin around the reference depth value of the patch.

In an embodiment, the training unit optimises the local context depth margin during the learning process of the random forest so as to maximise the classification accuracy.

In an embodiment, the step of generating a gesture hypothesis (gesture class and its position) comprises the steps of
(1) the gesture detection unit generates a score map per gesture class, representing the global confidence of each class to appear in a specific position of the image. The score map is computed by sparsified kernel density estimation.
(2) the gesture detection unit models updates the score map averaging score maps over time, giving more importance to the most recent score maps.
(3) the gesture detection unit thresholds all the score maps with gesture dependent thresholds that can be automatically or manually set. The global maximum of the ensemble of thresholded score maps is then determined. As a result, the position and gesture class of the still gesture with more confident response is provided as gesture hypothesis.

In an embodiment, the training unit generates a decision forest to be used by the detection unit to classify the still gestures performed by the user. The process comprises the following steps:
(1) The system asks the user to perform the desired gesture (target gesture) and the system incrementally updates the random forest using the data captured by the sensor.
(2) The system asks the user to perform gestures distinct from the target gesture, such that the system would use these negative examples to improve the learned model.
(3) Steps (1) and (2) are performed iteratively. The learning procedure is incremental and can be stopped at any time, and the result is a decision forest which can be used to localize the gesture in 3D space.

The training procedure can be resumed to provide more data to the model and improve its performance. The user or other person can perform the positive and negative examples again and system will continue training the incremental machine learning model accordingly.

The detector is trained online and in real-time, such that is ready to use during the training procedure.

The detector is used during the training procedure to collect relevant negative examples. False negatives with higher detection responses are selected as relevant negative patches.

In an embodiment, the present invention provides tracking-by-detection of still gestures. Tracking-by-detection labels detections across frames in order to retrieve the trajectory of a gesture along time. As consequence, this embodiment can provide body part tracking (e.g., tracking of a 'hand detached from torso') or tracking of more precise gestures (e.g, tracking of 'thumbs up'). Besides, this aspect of the invention allows to use cursor-based controls.

BRIEF DESCRIPTION OF THE DRAWINGS

Variants of the method for setting a tridimensional shape detection classifier and method for tridimensional shape detection using said shape detection classifier are illustrated by way of non-limiting example in the attached drawings. Specifically.

DETAILED DESCRIPTION OF THE DRAWINGS

Figure 1:
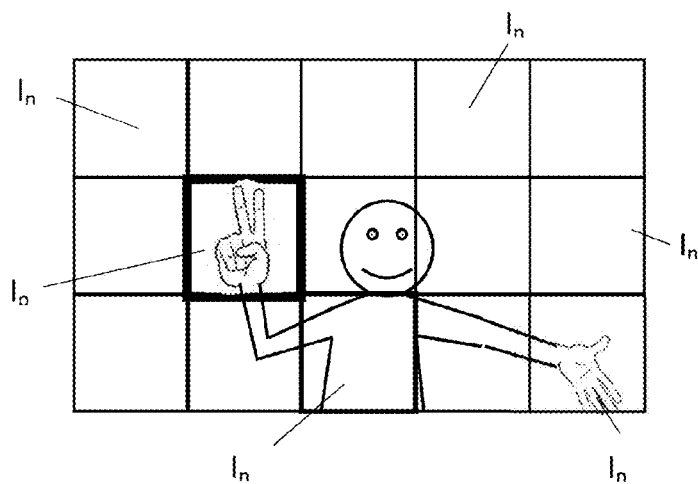
FIG. 1 depicts a depth image representing a scene divided into a plurality of patches.

FIG. 1 shows a depth image representing a scene in which each pixel represents a depth distance from a source to a scene. As can be seen, the depth image is dividable into one or more patches Ip, In of given dimensions. The patches shown in FIG. 1 are squared, but any other shape of the patch could be used.

It can be seen that in the scene shown in the depth image of FIG. 1 a user performs a hand gesture in an area of the depth image already known to the user, as this hand gesture will be set as the tridimensional shape to the detected by the shape detection classifier of the invention. The patches covering said area of the depth image where the user performs the hand gesture will be labelled as positive patches $I_p$ and the rest of the patches of the depth image will be labelled as negative patches $I_n$ and they will be used to train the classifier as follows. Although in FIG. 1 the patch size is bigger than the gesture performed by the user, in other embodiments the patch size could be smaller than the gesture, so more than one patch of the depth image would be a positive patch. Usually, for a depth image resolution of 640×480 pixels a squared patch size from 30 to 200 pixels, typically 50 pixels is advisable. Although in FIG. 1 the shown patches are not overlapped, the patches could also be overlapped.

The classifier of the present invention comprises a forest that will have at least a binary tree used for obtaining the class probability of the shape. The nodes of the binary trees will use a distance function that taking at least a pixel position in a patch calculates a pixel distance. The distance function is also known as binary test or binary function.

Figure 2:
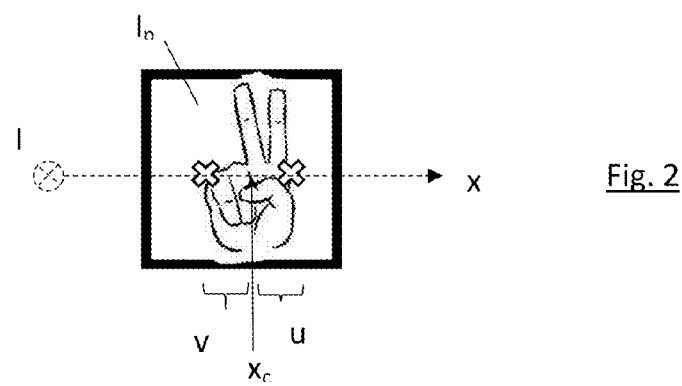
FIG. 2 depicts the detail of a patch of the depth image of FIG. 1.
Figure 3:
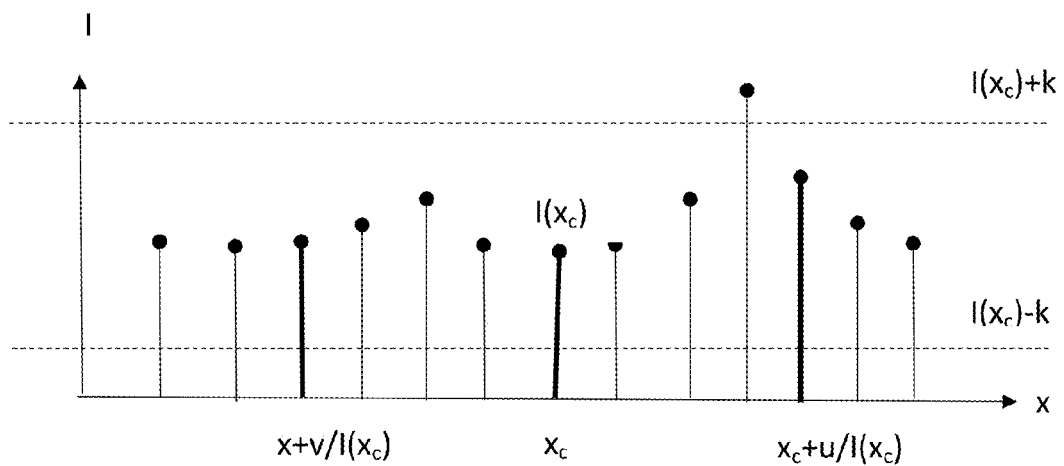
FIG. 3 depicts part of the pixel distances the patch of FIG. 2 used to calculate a distance function.

In the depicted embodiment, as can be seen in FIGS. 2 and 3 the distance function takes two pixel position u, v of the patch $I_p$ and calculates the relation between the depths represented by the two pixels of the patch located in the pixel position u, v from the center pixel $x_c$ of the patch, normalized with the depth evaluated in the center pixel $x_c$, each depth being upper and lower limited by a depth distance clipping window k centered in the value of depth represented by the center pixel x of the patch, as per the formula $$f(I, x) = \max\left(\min\left(I\left(x + \frac{u}{I(x)}\right), I(x) + \kappa\right), I(x) - \kappa\right) - \max\left(\min\left(I\left(x + \frac{v}{I(x)}\right), I(x) + \kappa\right), I(x) - \kappa\right)$$

The distance function would be calculated per every patch of the depth image using groups of random parameters, also known as number of random tests, as explained below.

The method for setting the shape detection classifier of the present invention comprises creating candidate groups of parameters, each group comprising at least a random pixel position u, v in a patch, random depth clipping window k in the patch and a random pixel distance threshold θ that will be used for classifying the result of the distance in a given node. Namely, between 100 and 5000 groups of parameters are advisable, normally taking 200 as a default value that allows a detection that may be useful for an average detection. If differences between the gesture and the background or negative examples are subtle more groups of parameters are advisable.

Obviously, the random pixel position u, v has to be a pixel within the patch, so for a squared patch and a pixel position u, v being a vertical or horizontal distance from the center pixel of the patch, the random values of pixel position u, v has to point to a pixel within the patch. Although vertical or horizontal distance from the center pixel of the patch can be used, other positions, relative or absolute, using Cartesian or polar coordinates can be used as long as the pointed pixels are the same in different patches.

Also, the random depth clipping window k has to be between 0 and the maximum distance of the depth image. Typically for a depth image being a grayscale image with 8 bits per pixel, k has to give a total window between 0 and 256.

Figure 4:
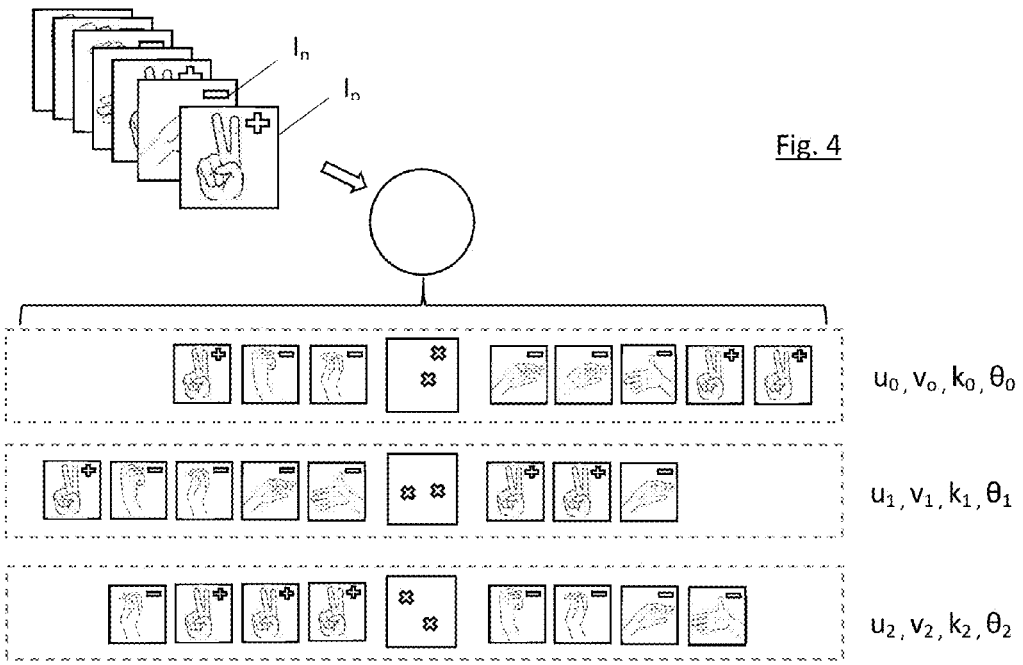
FIG. 4 depicts the initial population of a binary tree forest of the shape detection classifier.

As shown in FIG. 4, the groups of random parameters ($u_0$ $v_0$ $k_0$ $\theta_0$); ($u_1$ $v_1$ $k_1$ $\theta_1$) and ($u_2$ $v_2$ $k_2$ $\theta_2$). are associated with a leaf node that is a root node of a tree.

In the embodiment depicted in FIG. 4 only three groups of parameters are shown, for simplifying the explanation of the method. Naturally, as previously explained the number of groups of parameters must be higher to obtain results that could allow a proper shape detection.

For setting the classifier, one or more positive patches Ip containing the shape, or part of the shape, to be detected and one or more negative patches In not containing the shape to be detected must be obtained and processed in each node using the distance function with each group of random parameters.

It is advisable that the one or more negative patches are the ones with highest positive class probability according to the statistics at the reached leaf nodes of the binary trees.

Therefore, as shown in FIG. 4 in the leaf node the distance function has to be calculated per each patch to the positive and negative patches using the pixel position and clipping window of its associated group of parameters, and then comparing the result of the distance function with the random pixel distance threshold computing its statistics as the proportion of positive and negative samples.

Following this procedure it can be seen that some candidate groups will fail to separate the positive and negative patches, thus not being appropriated as no information can be extracted.

Figure 5:
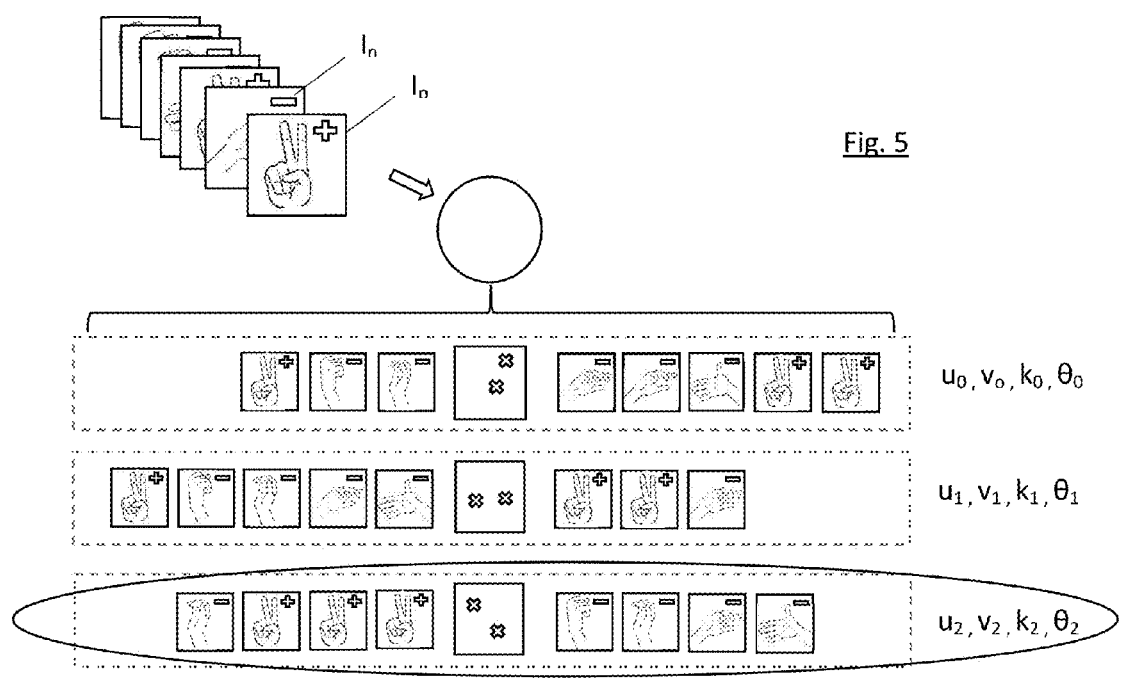
FIG. 5 depicts the configuration step of a root node of the shape detection classifier of FIG. 4.
Figure 6:
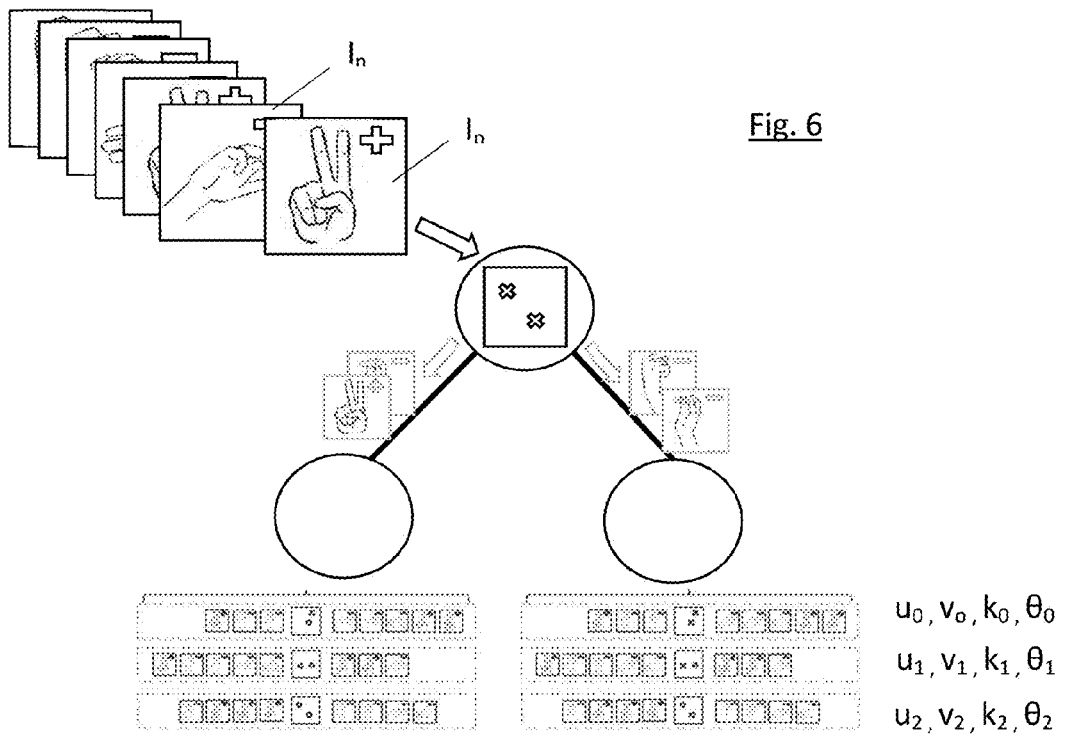
FIG. 6 depicts the creation of a second level in the binary tree of the shape detection classifier of FIG. 5.

A rule for deciding that the positive and negative patches are correctly separated could be if at least 50% of positive patches and at least 50% of negative patches are correctly grouped and separated. Also the candidate group that maximizes the information gain in said node could be decided to be the one that separates the positive and negative patches. As shown in FIG. 5, the candidate group that best separates the positive and negative patches into two groups when applying the distance function are selected When more than a predefined number of positive or negative patches are applied to a leaf node of the shape detection classifier, namely between 100 and 2000, preferably 300, and also preferably if the information gain in said node reaches an information threshold between 0 and 0.1, a new level of the binary tree is created from the leaf node, for processing further one or more positive patches Ip and negative patches In which are separated in the two groups of patches in the parent node in each respective children node as shown in FIG. 6.

Figure 7:
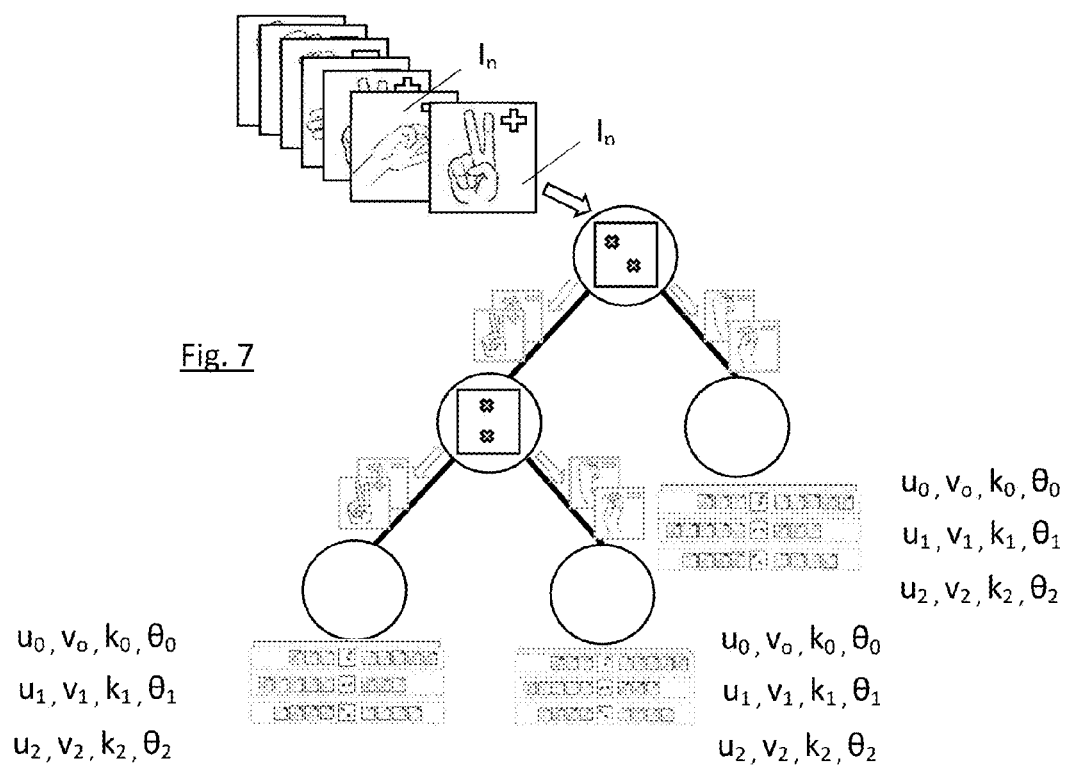
FIG. 7 depicts the creation of a third level in the binary tree forest of the shape detection classifier of FIG. 5.

Also, the statistics from the parent node are passed from the parent node to each respective children node and the configuration steps previously detailed for the root node are applied, obtaining a candidate group of parameters that best separate the positive and negative patches into two groups in each children node Therefore, all candidate groups of random parameters ($u_0$ $v_0$ $k_0$ $\theta_0$); ($u_1$ $v_1$ $k_1$ $\theta_1$) and ($u_2$ $v_2$ $k_2$ $\theta_2$) can be tested in a children node. However, no more information could be obtained from the group of random parameters already used in any parent node, so it can be skipped. It is also possible creating new candidate groups of random parameters per each leaf node. In fact, it is preferable as This step can be reproduced again, recursively, creating new levels of the binary trees, as shown in FIG. 7.

Figure 8:
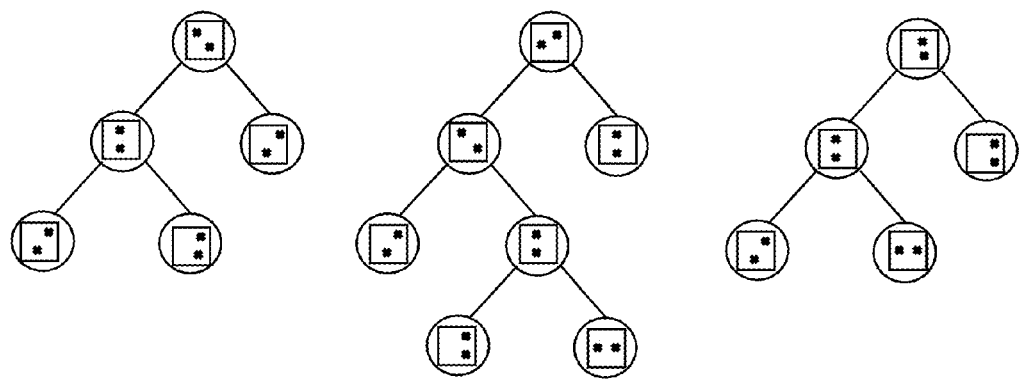
FIG. 8 depicts another binary tree forest of a shape detection classifier.

FIG. 8 represents a forest of binary trees in which each node is associated with a binary test, each leaf node having the computed statistics with the probability of a given patch to be of a specific hand gesture class; it is p(c|I).

Figure 9:
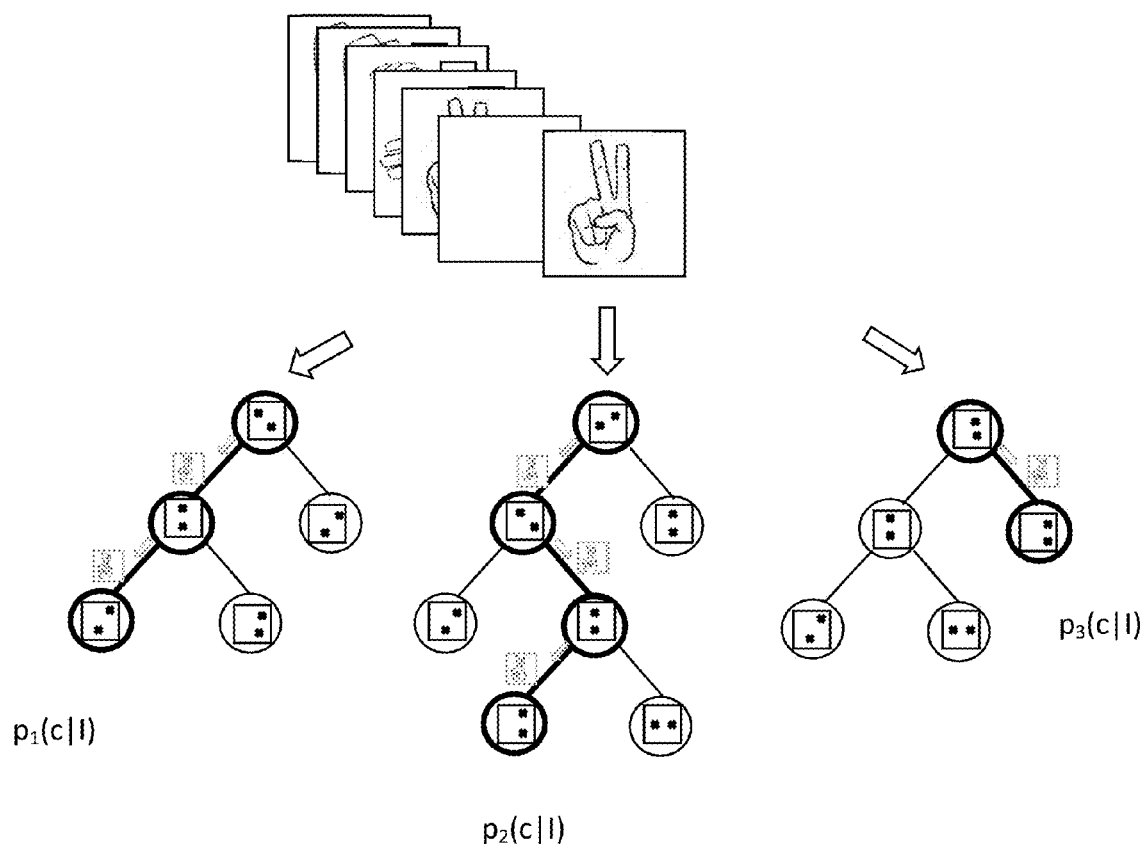
FIG. 9 depicts the method for tridimensional shape detection using the binary tree forest of the shape detection classifier of FIG. 8.

FIG. 9 represents the method for shape detection from a depth image using the shape detection classifier of FIG. 8 that comprises the steps of dividing the depth image into patches of given dimensions and traversing the binary trees by applying the distance function at each visited node using the associated pixel displacement u,v and maximum pixel distance k and comparing the result of the distance function with the associated pixel distance threshold $\theta$ and obtaining the probability p of a specific shape leveraging on the statistics of the leaf nodes reached in each tree.

As shown in FIG. 9, there are three trees in the forest that could give different probabilities, so the probability of a specific shape obtained from the different leaf nodes of binary trees can be averaged, for example according to:

$$p(c \mid I, x) = \frac{1}{M}\sum_{m=1}^{M} p_{l_m}(c \mid I, x)$$

Where m=1 ... M represents the different leaf nodes of the binary trees.

Once the probability of a specific shape is obtained from the classifier, so it can be determined if a patch contains of not the hand gesture, for example if p>0.5, it is advisable to evaluate the patch surrounding said patch. It can be done by casting a vote for a target shape per each patch whenever the probability of said shape is higher than the probability of not being said shape or being another shape, and estimating a probability density for the target shape using said votes. This way, if more than one patch covers the gesture, the result can be verified by evaluating the votes of the neighboring patches with p>0.5.

Also, temporal consistency can be taken into account by recursively updating the probability density with votes aggregated from past time instants as follows:

$$p'(c|I_t)=\alpha p(c|I_t)+(1-\alpha)p'(c|I_{t-1})$$

It is also advisable detecting the pixel location of the target shape as the pixel with maximum probability, as it may help on tracking the gesture over time.

Also, the probability can thresholded by locally integrating the probability measure through a circular surface of radius inversely proportional to the depth and centered at the global maximum.

Figure 10:
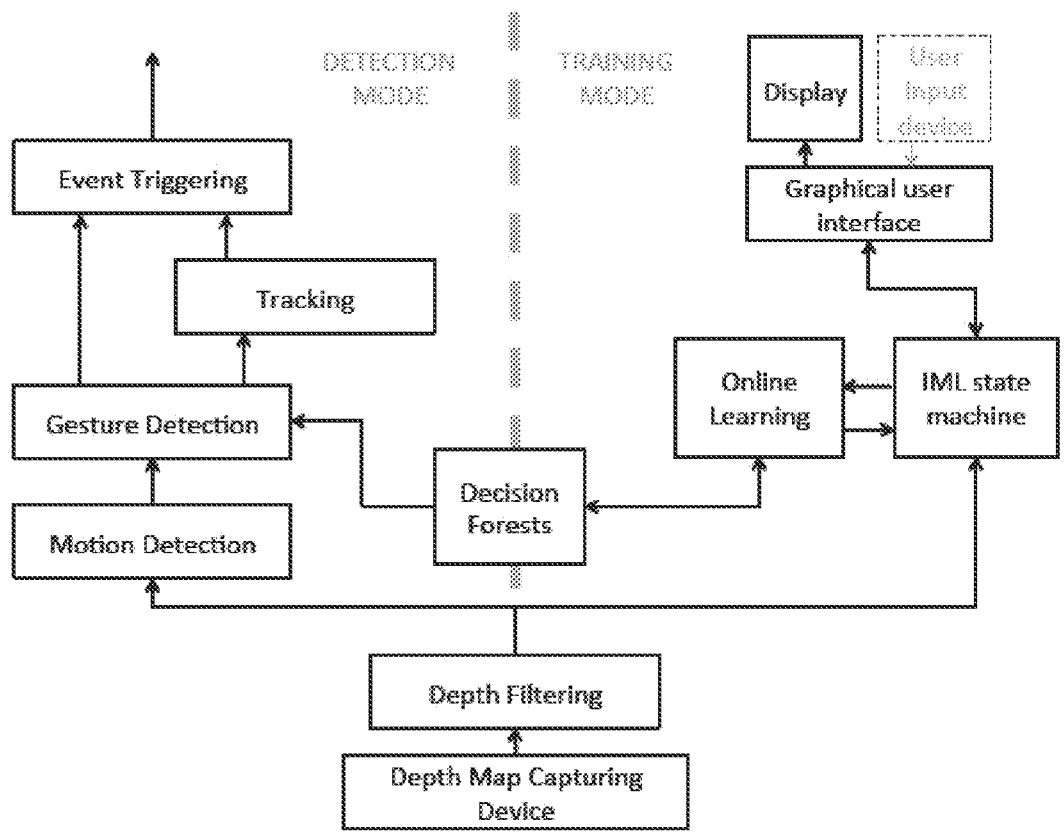
FIG. 10 depicts a system diagram for executing the method for setting the shape detection classifier and the method for tridimensional shape detection.

Also, a system to perform the previous method is described. The system has two distinct modes of operation, the Training Mode and the Detection Mode. Depending on the mode it operates distinct processing units are involved, as it is shown in the system diagram in FIG. 10.

In training mode, the system generates a decision forest data structure obtained by learning from the examples captured by the capturing device.

In detection mode, the system generates events for the gestures detected in the depth maps captured by the capturing device.

In the following, the processing units of the system are described in more detail.

Training Mode

The training mode allows the user to train the system to detect new gestures. Hence, the result of the process is a decision forest data structure that would be used to detect the specific gesture by the detection unit introduced above.

The system operations are governed by the Interactive Machine Learning (IML) state machine. Depending on the state defined by the IML state machine, different sorts of information are displayed to the user, and the training unit acts accordingly. The goal is to provide the training unit with annotated positive and negative examples of the gesture, extracted from the images captured by the depth capturing device, in a semi-automatic (or fully-automatic) manner.

Figure 11:
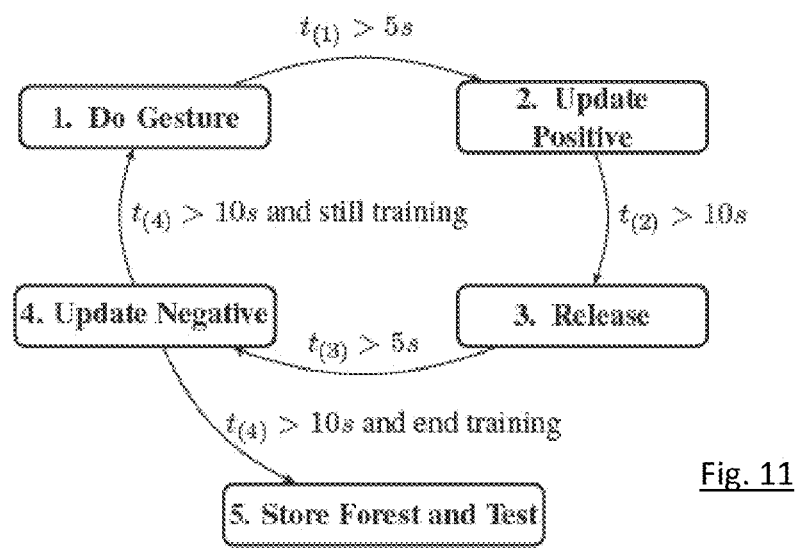
FIG. 11 depicts a states diagram for the state machine for the Interactive Machine Learning of the system of FIG. 10.

An example of a state machine realization is described by the following set of states, with transitions described in FIG. 11:

1. do gesture. The user is asked to perform the gesture to train centered in the bounding box suggested. The display shows a bounding box with a cross in the center.
2. update positive. The user is asked to keep the gesture centered in the bounding box while performing minor pose variations to introduce variability. During this phase the display shows the bounding box centered. Depth images with annotated bounding boxes are used by the training unit to update the random forest with positive samples.
3. release. The user is asked to release the gesture, and wait for more instructions.
4. do negative examples. The user is asked to perform other gestures that should be distinguished by the system. Depth images are used by the training unit to update the random forest with negative samples.

This sequence of states can be executed several iterations to capture more variability of the gesture, such as distinct contexts, backgrounds, distances or slightly modified poses. Also, more negative examples can be added at each iteration, improving the generalization of the detector. At the end of a training session, the application launches a testing mode that allows to check the performance of the current detector and realize its main failures. The random forest also can be stored in disk, such that the application can be stopped, and the user can change the settings, the scenario, and for example other user can continue the training. The stored random forest is loaded and can be updated again with new data, so the trees continue growing from the point they were left in the previous iteration.

Training Unit. The training unit is based on Random Forests online learning. The procedure to train a classifier for a new gesture consists in growing the decision trees upon arrival of new samples. A tree starts with only one root node with a set of binary tests with the variables u, v, k and $\theta$ have been randomly selected. Two conditions should apply before splitting a node:
1) a minimum number of samples has been already seen by the node,
2) the split achieves a minimum information gain.

When such conditions are fulfilled, the test that produces the greatest information gain is chosen. Such process is applied to the right and left newly generated leaf nodes, and so until the tree has grown to the required depth. At each split, the statistics for each class label of the parent node are propagated to children such that leaf nodes can perform classification on-the-fly, even before observing new samples.

Hard negative mining using on-the-fly detection. The set of negative samples used for training is highly relevant for the performance of a detector. From the annotated images, collecting all the patches of the whole image is not practical, so methods rely on randomly sampling patches, as it is not clear in advance which patches from this images would be more useful as training samples.

In this invention, the method collects the negative patches from the training images using the prediction of the online forest during the training phase. In this manner, the training process is done in a single iteration and the set of examples used to update the trees is reduced, so that redundant or non informative patches are not used. The procedure is applied during training for each negative training image $I_{neg}$ as follows:
1. The probability for the positive class c for each pixel x in $I_{neg}$, p(c|x) is computed on-the-fly using the statistics collected at the current leaf nodes.
2. A pseudo-probability value for each pixel is computed using a Parzen estimator with a Gaussian kernel. Then we obtain the location with maximal probability $m_c$. We denote maxp the probability at $m_c$.
3. A set of $N_{neg}$ patches are collected within a neighborhood centered at $m_c$. The number of patches collected is proportional to maxp, so in this manner the worse is the failure of the detector, more negative samples which produce the failure are used for training.

Depth Filtering Unit

In the system, a depth data processing unit filters the data captured by the sensor in order to correct depth measurement errors. Such process exploits local context and prior knowledge of the sensor inaccuracies.

Motion Detection Unit

The action of performing a gesture implies body movement from the stand by pose to the gesture pose. In this invention, a motion detection unit determines regions of the image where objects or people in the scene have moved. Such information is then exploited to detect the still gestures within such regions. In this manner the computation effort of the system is reduced and it has a very low computational load while there is no activity in the scene.

Gesture Detection Unit

Given a set of patches from the depth image, the Gesture detection unit generates hypothesis of the position of a gesture in the image and its class. In order to generate the hypothesis the unit relies on a patch classifier and a function that integrates classifier votes at the different pixel locations.

The patch classifier is based on a Random forest classifier. Random forests are an ensemble of m randomized binary trees. Nodes n in each tree have associated a weak classifier that consists in a binary function (from now on binary test) of feature vectors obtained from the image. Moreover, each node n have a learned probability distribution p(c|I,x) that reflects how likely is a class c given a pixel x in the image I. To obtain the class probability for a patch, every tree is traversed recursively from the root, branching left or right depending on the result of the binary test applied to the patch at each node, until a leaf node is reached.

The robustness of forests is based on the combination of several classification trees. The combination is obtained by averaging the distributions over the leaf nodes $\{l1 \ldots l_M\}$ reached in all the M trees:

$$p(c \mid I, x) = \frac{1}{M} \sum_{m=1}^{M} p_{l_m}(c \mid I, x)$$

In this invention, the binary tests rely in the depth value difference between two pixels located within a patch of a given size. In order to avoid background clutter we impose a local context also in 3D space, by introducing the clipping parameter that defines a maximum displacement in the Z axis, i.e depth values.

Given a depth image I, the binary test for a patch centered at x is the result of the comparison f(I, x)>θ, where f(I, x) is formulated as follows:

$$f(I, x) = \max\left(\min\left(I\left(x + \frac{u}{I(x)}\right), I(x) + \kappa\right), I(x) - \kappa\right) - \max\left(\min\left(I\left(x + \frac{v}{I(x)}\right), I(x) + \kappa\right), I(x) - \kappa\right)$$

where u and v are pixel displacements that fall within a patch size. Pixel displacements are normalized with the depth evaluated at pixel x in order to make the test features invariant to depth changes. The set of parameters u, v, k and the threshold θ for each of the nodes n are defined by during the learning process, which is performed by the learning unit. For each node, the process builds a set of test functions with randomly generated parameters. Then, the optimal test for each node is selected according to information gain criteria.

Gesture Localization Function

For gesture detection and localization, a set of patches are provided to the detection forest, which casts a vote whenever a positive class has more probability than the negative class and other positive classes. Requiring the positive scores to be larger than the negative scores yields a sparsified voting across the image (i.e., only a few patches happen to have larger positive scores). To detect a gesture, the function first estimates a probability density using the votes within a frame and then takes into account temporal consistency by recursively updating this distribution with votes aggregated from past time instants. In order to construct the probability density, it uses a Parzen estimator with Gaussian kernel. In order to account for the time component of the approximated density, the density $p(c|I_t)$ is sequentially updated as follows:

$$p'(c|I_t) = \alpha p(c|I_t) + (1-\alpha)p'(c|I_{t-1})$$

This is a simple yet effective method to keep temporal consistency of the casted votes, as it requires storing a single probability map.

The pixel location $g_c$ of a gesture class c>0 is computed as the pixel location with maximum probability. To ensure that such a maximum represents a target gesture, the probability volume V is thresholded by locally integrating the estimated pseudo-probability measure:

$$V = \sum_{x \in S} p'(c \mid I_t(x))$$

where S is a circular surface element of radius inversely proportional to the depth, and centered at the global maximum. In this way, the localization is depth-invariant.

Gesture Tracking-by-Detection

An aspect of the present invention relates to tracking of gestures. Tracking implies obtaining the trajectories of gestures present in the depth image. Trajectories are further used as mouse like controls (e.g., slider sliders, pointers, etc.).

Tracking is formulated as an energy minimisation problem with the following functional:

$$E(X, Z) = \sum_j \phi(x_j, z_j) + \sum_i \sum_j \phi(x_i, x_j, z_i, z_j)$$

where x denotes the set of hand locations and Z the full set of observations (or evidence, measurements); $x_j$ are candidate locations in the current frame, $z_j$ are observations in the current frame; $x_i$ and $z_i$ are candidates and observations on the previous tracked frame.

Hence, first term represents unary potentials, the second term gathers pairwise potentials.

Currently, unary potentials are detection responses obtained with the present invention, whereas pairwise are modelled as a sum of the following terms:

Distance cost: Measures the 2D distance between 2 tracks $x_i$; $x_j$ in consecutive frames;

Appearance cost: Measures the L1 norm between two candidate patches (depth data only);

In practice, the problem is equivalent to minimise the energy in a bipartite graph (association), and hence it is solved with the Hungarian or Munkres algorithm.

A second step, called Track Management, follows the energy minimisation. It basically removes tracks when:

Overlap between two hand positions/candidates (duplicates)

Tracks in death zones (borders)

Tracks are lost for a given period of time

Track management works by considering two track states, active and lost:

Active tracks: Energy minimization is solved only for active tracks, which are typically visualized in the screen with a color representing their ID.

Lost tracks: After getting low tracking scores, the manager declares a track "lost". Lost tracks stay in a pool waiting for a new incoming hand detection to "resurrect" them and go back to active. However, lost tracks are removed if no detection appears after a few frames or if the track was lost near to a death zone.

Alongside, the gesture detector is run at every frame in order to incorporate new detections as new potential tracks.

APPLICATION EXAMPLES

The system described herein may be used for a wide range of applications. For example, the system can be used to activate functions of a device remotely. The device comprises an electronic mechanism of activation of its functions. A set of gestures are defined and associated to distinct functions of the device. The present invention generates the electronic signals that activate the function of the device when the user performs the specific gesture. Home appliances are devices suitable to be controlled with the present invention. For example, the system can be used to modify the intensity of light bulbs, operate the thermostat and heating system or to choose songs and tune volume of the audio equipment.

Gestures convey a semantic component usually related to cultural context, which may differ from user to user. The present invention allows the user to train the system to detect the specific gesture the user prefers in order to activate certain device function such that it remains consistent with semantic prior conditions.

Interaction with large screens is another application example of the present invention. Large screens are usually observed from distance, hence gestural interaction fulfill this need of remote control. In unconstrained conditions, users use gestures and hand movements for non-verbal communication, but the system should only react to gestures when the user actually wants to interact with the application. By means of the system presented herein, the interactive application can be activated or deactivated using a specific gesture not usually employed in natural conversation. In this manner, the gestural interaction interface of the system is not interfered or activated by gestures unintentionally performed by people in front of the screen.

The invention claimed is:

1. A method for setting a tridimensional shape detection classifier for detecting tridimensional shapes from depth images in which each pixel represents a depth distance from a source to a scene, each depth image being dividable into one or more patches ($I_p$, $I_n$) of given dimensions, the classifier comprising a forest of at least a binary tree for obtaining the class probability of a given shape comprising nodes associated with a distance function (f) that taking at least a pixel position in a patch calculate a pixel distance, the method comprising:

obtaining one or more positive patches ($I_p$) of the given dimensions from a depth image, said one or more positive patches containing the shape to be detected, and obtaining one or more negative patches ($I_n$) of the given dimensions from a depth image, said one or more negative patches not containing the shape to be detected, the method comprises:

for each obtained positive or negative patch traversing the binary trees starting from their root node using the distance function at each node to decide to continue to one of the child nodes of the next level until a leaf node of each binary tree is reached;

calculating in each reached leaf node the distance function for the patch using candidate groups of parameters, each candidate group of parameters comprising:

at least a pixel position (u, v) in a patch, a depth clipping window (k) in the patch and a pixel distance threshold ($\theta$);

by comparing the result of the distance function using the at least a pixel position and the depth clipping window with the pixel distance threshold of each candidate group, and computing its statistics;

and when more than a predefined number of positive or negative patches are applied to a leaf node of the classifier:

selecting for that leaf node the candidate group of parameters that best separate the positive and negative patches into two groups for calculating the class probability of the shape in that leaf node using the distance function;

creating a new level of the binary tree from that leaf node comprising two newly created leave nodes, thus that leaf node becoming a node, and passing the statistics from that leaf node that has become a node to the newly created leaf nodes.

2. The method according to claim 1, wherein each candidate group of parameters comprises
at least a random pixel position (u, v) in a patch,
a random depth clipping window (k) in the patch and
a random pixel distance threshold (θ).

3. The method according to claim 1, wherein at least part of the one or more positive patches and one or more negative patches are obtained from the same depth image.

4. The method according to claim 3, wherein the obtained one or more negative patches are the ones in each depth image with highest positive class probability according to the statistics at the reached leaf nodes of the binary trees.

5. The method according to claim 1, wherein the distance function calculates the relation between the depths represented by two pixels of the patch located in the random pixel position (u, v) from the center (x) pixel of the patch, normalized with the depth evaluated in the center pixel, each depth being upper and lower limited by the random depth distance clipping window centered in the value of depth represented by the center pixel of the patch, as per the formula:

$$f(I, x) = \max\left(\min\left(I\left(x + \frac{u}{I(x)}\right), I(x) + \kappa\right), I(x) - \kappa\right) - \max\left(\min\left(I\left(x + \frac{v}{I(x)}\right), I(x) + \kappa\right), I(x) - \kappa\right).$$

6. A method for shape detection from a depth image using the shape detection classifier of claim 1, comprising the steps of:
dividing the depth image into patches of given dimensions;
traversing the binary trees by applying the distance function at each visited node using the associated pixel displacement (u,v) and maximum pixel distance (k) and comparing the result of the distance function with the associated pixel distance threshold (θ) and;
obtaining the probability (p) of a specific shape leveraging on the statistics of the leaf nodes reached in each tree.

7. The method according to claim 6, further comprising:
averaging the probabilities of a specific shape obtained from the different leaf nodes of binary trees of the forest according to:

$$p(c \mid I, x) = \frac{1}{M} \sum_{m=1}^{M} p_{l_m}(c \mid I, x)$$

Where m=1 . . M represents the different leaf nodes of the binary trees.

8. The method according to claim 6, further comprising the steps of:
casting a vote for a target shape per each patch whenever the probability of said shape is higher than the probability of not being said shape or being another shape, and
estimating a probability density for the target shape using said votes.

9. The method according to claim 6, further comprising taking into account temporal consistency by recursively updating the probability density with votes aggregated from past time instants as follows:

$$p'(c|I_t) = \alpha p(c|I_t) + (1-\alpha) p'(c|I_{t-1}).$$

10. The method according to claim 6, further comprising detecting the pixel location of the target shape as the pixel with maximum probability.

11. The method according to claim 6, wherein the probability is thresholded by locally integrating the probability measure through a circular surface of radius inversely proportional to the depth and centered at the global maximum $$V = \sum_{x \in S} p'(c \mid I_t(x)).$$

12. The method according to claim 6, wherein the shape is a hand gesture.

13. A data processing apparatus comprising means for carrying out the method of claim 1.

14. A computer program stored on a non-transitory computer-readable medium and adapted to perform the method of claim 1.

* * * * *